United States Patent
Arntson et al.

(10) Patent No.: US 7,164,474 B2
(45) Date of Patent: Jan. 16, 2007

(54) APPARATUS AND METHOD FOR NORMALIZATION OF A DRILLING TOOL TO A WORK SURFACE

(75) Inventors: Paul R. Arntson, Bothell, WA (US); Christopher D. Condliff, Issaquah, WA (US); Robert A. Cullen, Everett, WA (US); David P. Himmel, Sedona, AZ (US); Darrell D. Jones, Mill Creek, WA (US); Ronald W. Outous, Shoreline, WA (US); David W. Princehouse, Hood River, OR (US)

(73) Assignee: The Boeing Company, Seattle, WA (US)

( * ) Notice: Subject to any disclaimer, the term of this patent is extended or adjusted under 35 U.S.C. 154(b) by 396 days.

(21) Appl. No.: 10/191,268

(22) Filed: Jul. 8, 2002

(65) Prior Publication Data

US 2004/0004712 A1    Jan. 8, 2004

(51) Int. Cl.
*G01B 11/26* (2006.01)
*G01B 11/00* (2006.01)
*G01C 1/00* (2006.01)
*G01C 15/00* (2006.01)
*B25B 23/18* (2006.01)
*B23B 49/00* (2006.01)
*B23G 1/00* (2006.01)

(52) U.S. Cl. ............. 356/154; 356/399; 362/119; 33/286; 408/16

(58) Field of Classification Search ........ 356/399–401, 356/154, 508, 152.3; 29/26 R, 26 A; 33/227, 33/263, 266, 286, 281–283, 290–295, 412, 33/415; 408/16, 75, 72 R, 113, 110, 116; 362/119

See application file for complete search history.

(56) References Cited

U.S. PATENT DOCUMENTS

| | | | | |
|---|---|---|---|---|
| 1,942,508 A | * | 1/1934 | Clark | 353/40 |
| 3,333,504 A | * | 8/1967 | Peak, Jr. et al. | 356/399 |
| 3,432,240 A | * | 3/1969 | Jackson | 356/152.2 |
| 3,435,532 A | * | 4/1969 | Brasier | 33/645 |
| 3,802,780 A | * | 4/1974 | Helm et al. | 356/141.1 |
| 3,911,588 A | * | 10/1975 | Ohneda | 33/286 |
| 5,031,203 A | | 7/1991 | Trecha | |
| 5,293,048 A | * | 3/1994 | Skunes et al. | 250/559.29 |
| 5,426,687 A | | 6/1995 | Goodall et al. | |
| 6,000,939 A | | 12/1999 | Ray et al. | |
| 6,565,227 B1 | * | 5/2003 | Davis | 362/119 |
| 6,692,200 B1 | * | 2/2004 | Peterson | 408/1 R |

\* cited by examiner

*Primary Examiner*—Gregory J. Toatley, Jr.
*Assistant Examiner*—Gordon J. Stock, Jr.
(74) *Attorney, Agent, or Firm*—Alston & Bird LLP

(57) ABSTRACT

The apparatus for normalization of a drilling tool to a work surface includes a light source, a beam splitter, and a screen. The beam splitter directs and the screen receives at least a portion of the light reflected off of the work surface. When the received light is located in a predetermined portion of the screen, then the drilling tool is normal to the work surface. The method for normalization of a drilling tool to a work surface includes positioning the drilling tool proximate the work surface, transmitting light toward the work surface, creating an image of the light that has reflected off of the work surface upon a screen, thereby permitting the orientation of the drilling tool to be adjusted until the image of the reflected light is located in a predetermined portion of the screen that is indicative of proper alignment.

17 Claims, 8 Drawing Sheets

APPARATUS AND METHOD FOR NORMALIZATION OF A DRILLING TOOL TO A WORK SURFACE

BACKGROUND OF THE INVENTION

The apparatus and method of the present invention relates to positioning a drilling tool normal to a work surface and, more particularly, to ensuring that the position of the drilling tool remains normal to the work surface during operation of the drilling tool.

In many applications, it is imperative that holes in a structure, such as an aircraft, watercraft, building, bridge, or various other types of objects, are drilled perpendicular to the work surface. When holes are not drilled perpendicular to the work surface, the fasteners applied to the holes may not securely fasten the structure, which may negatively affect the integrity of the structure. In addition, the heads of fasteners applied to non-perpendicular holes may not lie flat on the surface of the structure, creating a problem in applications requiring a smooth surface, such as on the outer surface of an aircraft, watercraft, building, and the like.

In the aircraft industry, for example, fastener holes must be drilled within two degrees of normal in order to ensure the structural integrity of an aircraft. Holes that are not drilled perpendicular to the work surface may cause the fastener to not securely fasten parts of the aircraft or may adversely affect the performance of the aircraft. Thus, the non-perpendicular fastener hole must be repaired immediately, which interrupts the manufacturing process with unscheduled or out-of-sequence work to repair the defect. Because a considerable amount of labor is required to repair the non-perpendicular hole and because the repairs are not scheduled, the aircraft manufacturing process is typically interrupted for a significant amount of time, which is costly, not only with respect to the cost of labor, but also regarding the delay in delivery of the aircraft.

The conventional way to at least decrease the number of non-perpendicular holes that are drilled in a structure is to utilize a mechanical drill guide. A mechanical drill guide is typically a metal or plastic piece that must be held on the surface of the area to be drilled. The drill guide has at least one hole through which the drill bit may extend. The hole defined by the drill guide is perpendicular to the surface on which the drill guide is placed. The holes may be various sizes to guide various sizes of drill bits. After selecting the appropriate size hole in the drill guide, that hole must be placed over the area of the work surface to be drilled, and the drill bit is placed within the hole to align the drill bit with the area to be drilled. The wall of the drill guide hole about the drill bit keeps the drill operator from yawing the drill from side to side or pitching the drill bit up and down while the drill bit is within the hole. Therefore, the drill guide helps the drill operator to drill consistently perpendicular holes in a structure.

The user of a drill guide, however, must hold the drill guide onto the work surface with one hand and operate the drill with the other hand. In easily accessible locations, operating a drill with one hand is not a problem. In areas with limited access, however, it may not be physically possible for a drill operator to get in a position to be able to control the drill with only one hand. For instance, in the aircraft industry, drill operators typically must use two hands to drill holes around the stringers and frames in the fuselage of the aircraft, in the wing-stub join area of a Boeing 737 aircraft, and in the lower lobe region of a wide body aircraft because the drill operators do not have sufficient visual or spatial access in order to use one hand in these applications. Furthermore, drill operators generally must use both hands to operate certain types of drills, such as a ninety degree drill motor. Thus, when both hands must be used to operate the drill, the drill operator cannot also hold a drill guide on the work surface, which presents a substantial risk that these holes will not be drilled perpendicular to the work surface and, therefore, require costly repairs. Drill guides may, instead, be held upon a work surface by a clamp or the like. In many locations, however, it is difficult, if not impossible, to clamp the drill guide to the work surface.

Drill guides are also not useful in all situations because there may not be sufficient space to place a drill guide on certain work surfaces, such as in areas with severely limited access or on very small areas. In addition, even if the drill operator is able to initially position the drill guide properly on the work surface to be drilled, it may be difficult or impossible for the drill operator to continue to view the work surface and drill guide during drilling. As such, the drill operator cannot ensure that the drill will remain normal to the work surface throughout the drilling process.

Therefore, there exists a need in the industry for a drill operator to ensure that perpendicular holes are drilled in work surfaces regardless of the location or size of the work surfaces, such that fewer costly repairs of non-perpendicular holes will be required. In particular, there is a need to maintain normality of the drill to the work surface throughout the drilling process without having to use one hand to hold a drill guide on the work surface. Additionally, there is a need to provide a drill operator with a view of whether the drill is normal to the work surface in areas where the operator generally cannot view the area being drilled, i.e., when drilling blind holes.

BRIEF SUMMARY OF THE INVENTION

The apparatus and method for normalization of a drilling tool to a work surface of the present invention ensures that a drill operator can consistently drill holes that are perpendicular to a work surface regardless of the location or size of the work surface by providing feedback to the operator regarding the normality of the drill to the work surface. Because the drill operator can view the drill orientation during the drilling process and can correct the drill orientation if it moves from the normal position during the drilling process, fewer non-perpendicular holes are drilled and, thus, costly repairs are avoided. Furthermore, a drill operator utilizing the apparatus of the present invention can view whether the drill is normal to the work surface even when the operator generally cannot view the area being drilled. In addition, the apparatus and method of the present invention permit a drill operator to maintain normality of the drill to the work surface throughout the drilling process without having to use one hand to hold a drill guide on the work surface, such that the drill operator can use both hands for drilling, if needed.

The apparatus for normalization of a drilling tool to a work surface of the present invention includes a light source, a beam splitter, and a screen. The light source may be a diode laser. The beam splitter directs at least a portion of the light generated by the light source toward the work surface at a predetermined angle with respect to the drilling tool. The predetermined angle may be an angle such that the light is directed along a path parallel to the drilling tool. The screen receives at least a portion of the light reflected off of the work surface. The screen may have an indicator that is located to mark the point on the screen that will be illuminated in instances in which the light and, in turn, the drilling tool are perpendicular to the work surface. In addition, the screen may be made of ground glass. A reflective surface proximate the screen may also be included in embodiments of the apparatus of the present invention so that a drill operator may view an image of the screen when a direct view of the screen is obstructed. The reflective surface may be a mirror.

Embodiments of the apparatus also may have a housing to join the light source, beam splitter, and screen to the drilling tool. The housing may be swivably attached to the drilling tool. A specular reflector positioned on the work surface may be included in some embodiments to reflect the light toward the screen if the work surface is not itself a specular reflector. This specular reflector is a reflective surface that may be a mirror or optically smooth reflective tape. In addition, the apparatus of the present invention may also contain a timer for controlling the length of operation of the light source to preserve the power supply.

In the method for normalization of a drilling tool to a work surface of the present invention, the drilling tool may be positioned proximate the work surface and light may be transmitted at a predetermined angle with respect to the drilling tool. The predetermined angle may be such that the light is transmitted in a direction that is parallel to the drilling tool. In addition, in the method for normalization of a drilling tool to a work surface, an image of the light that has reflected off of the work surface may be created upon a screen and the drilling tool may be and, in turn, the direction in which light is transmitted may be oriented until the image of the reflected light is located in a predetermined portion of the screen.

In the method for normalization of a drilling tool to a work surface, a reflective surface may be placed proximate the screen in order to view the image presented by the screen when a direct view of the screen is obstructed. Prior to transmitting the light, a specular reflector may be positioned on the work surface. The light source and/or a beam splitter then may be positioned such that the light is incident upon and reflected off of the specular reflector on the work surface. In addition, the light is desirably maintained proximate the predetermined portion of the screen during operation of the drilling tool in order to ensure that a perpendicular hole is drilled.

According to another aspect of the present invention, the light source may be calibrated by aligning the light transmitted by the light source parallel with the drilling tool. The method of calibrating an apparatus for normalization of a drilling tool to a work surface of the present invention includes positioning the apparatus on a mounting fixture that holds the apparatus a distance from a reflective surface. The apparatus may be positioned such that the axis of a shaft of the apparatus that connects the apparatus to the drill is perpendicular to the reflective surface. The method of calibrating also includes adjusting the light source and/or the beam splitter until light generated by the light source is perpendicular to the reflective surface as indicated by an image of the light that has reflected off of the surface is located in a predetermined portion of the screen. The method of calibrating also includes adjusting the relative position of a housing containing the light source, beam splitter, and screen with respect to the drilling tool until an image of the light generated by the light source that has reflected off of a surface perpendicular to the drilling tool is located in the predetermined portion of the screen. Advantageously, the light source and/or the beam splitter may be adjusted prior to mounting the apparatus on the drill, and the housing may be adjusted subsequent to mounting the apparatus on the drill.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
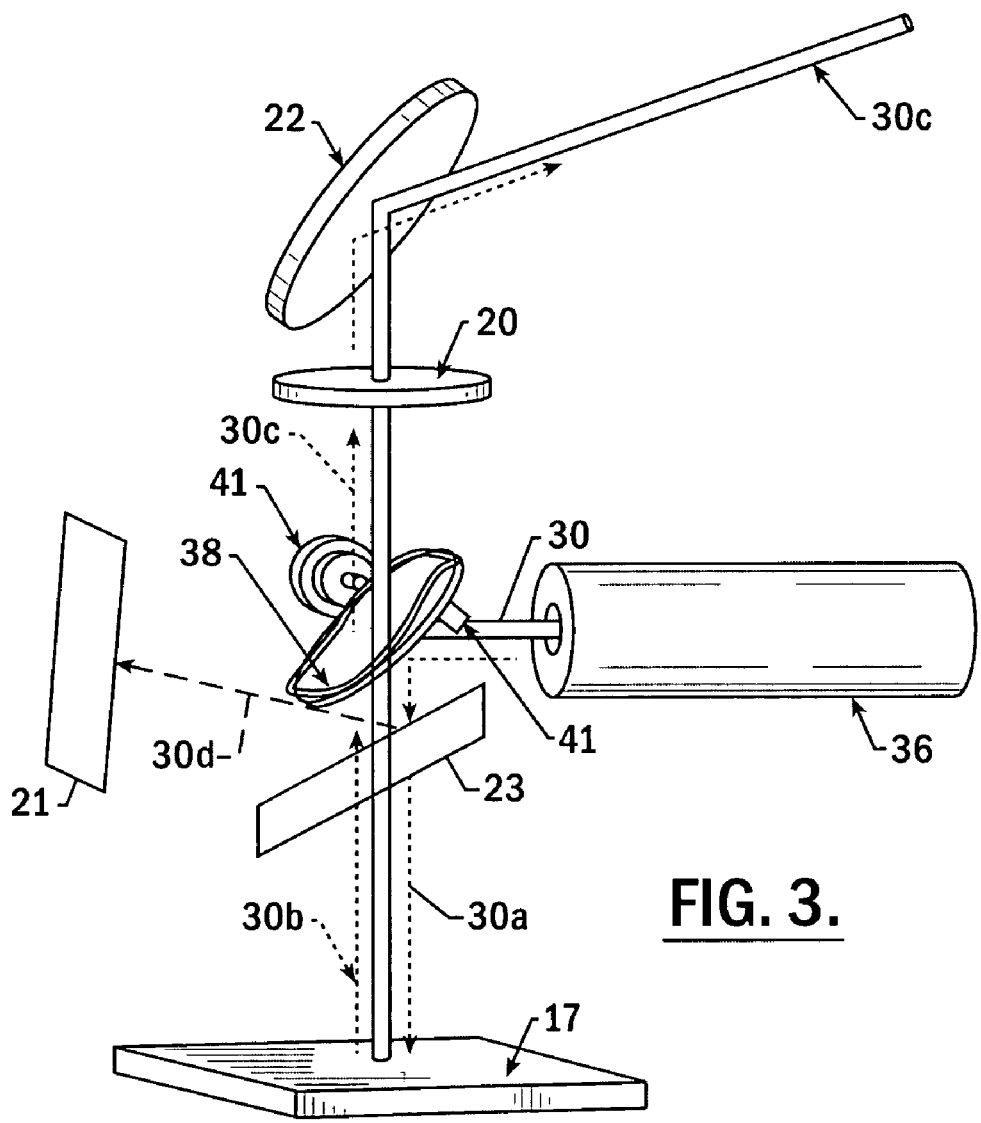
FIG. 3 is a perspective view of the optical components and light path according to the embodiment of the apparatus of FIG. 1.
Figure 7:
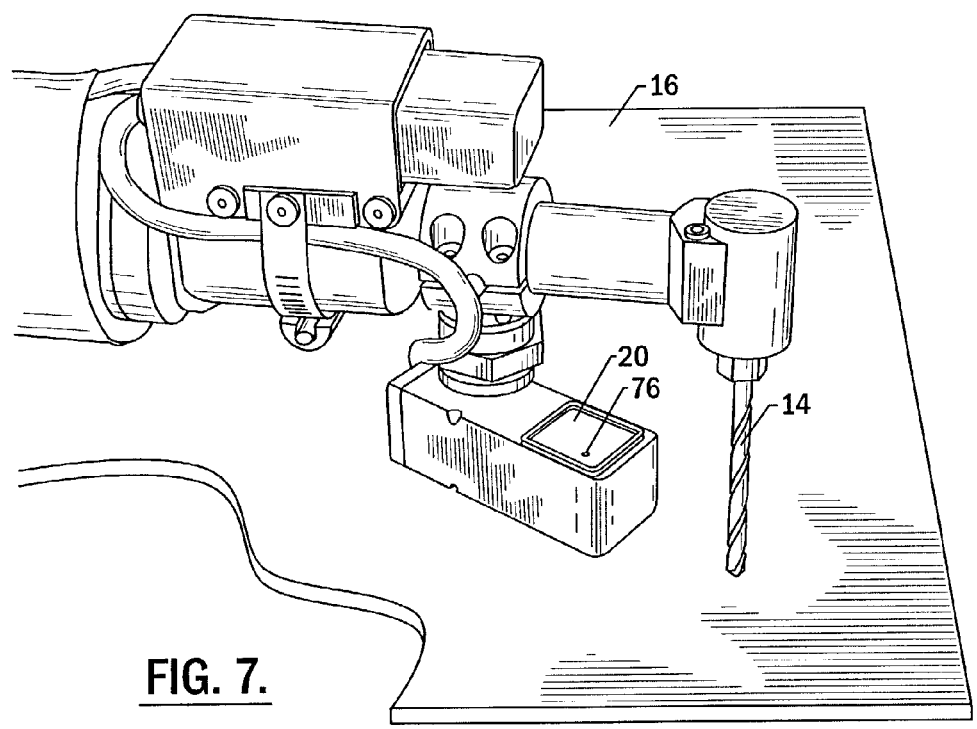
Figure 8:
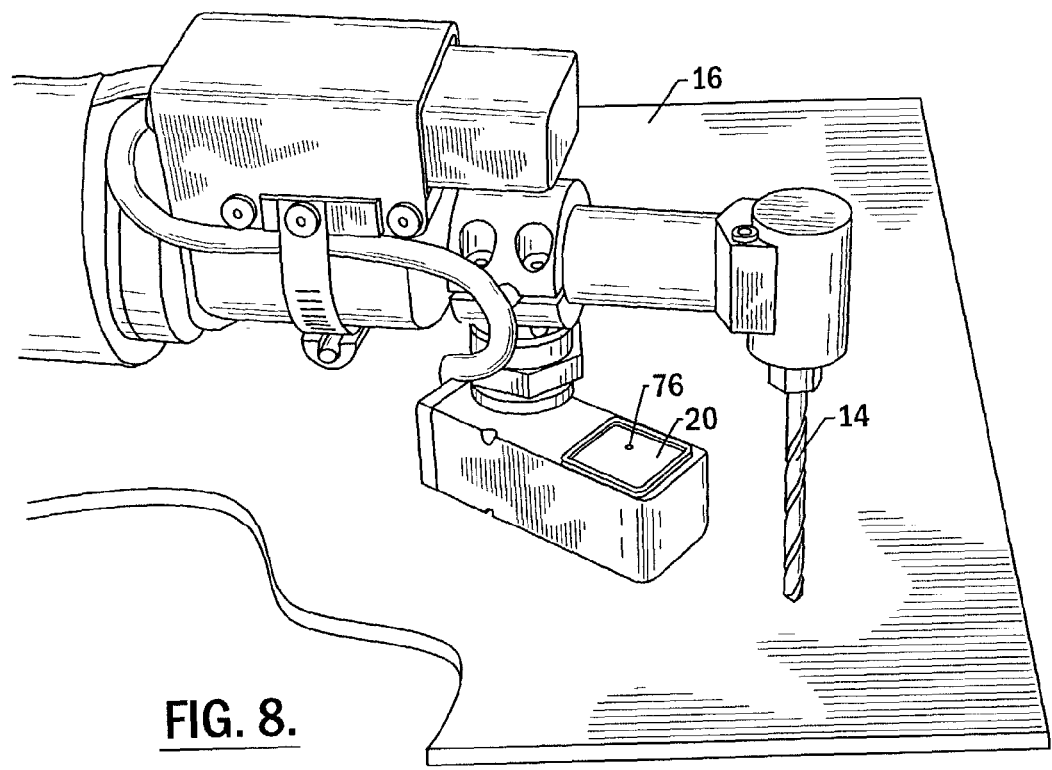

FIG. 7 is a perspective view of the embodiment of the apparatus of FIG. 3 where the light reflected off of the work surface and received by the screen is offset from the predetermined portion of the screen, i.e., the center of the screen, indicating that the drilling tool is not normal to the work surface; and FIG. 8 is a perspective view of the embodiment of the apparatus of FIG. 3 where the light reflected off of the work surface and received by the screen is located at or near the predetermined portion of the screen, i.e., the center of the screen, indicating that the drilling tool is normal to the work surface.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The apparatus and method for normalization of a drilling tool to a work surface of the present invention provides drill operators with the ability to ensure that the drilling tool is normal to the work surface throughout the drilling process regardless of the size or accessibility of the work surface. In addition, a drill operator can use both hands to operate the drill while maintaining normality of the drilling tool to the work surface, instead of having to use one hand to hold a drill guide on the work surface. Furthermore, embodiments of the apparatus of the present invention allow the drill operator to view a representation of the normality of the drilling tool to the work surface even when a direct view is obstructed. Thus, the apparatus and method of the present invention ensure that holes in a work surface are drilled perpendicular to the surface, which results in fewer costly and time-consuming repairs on non-perpendicular holes.

Figure 1:
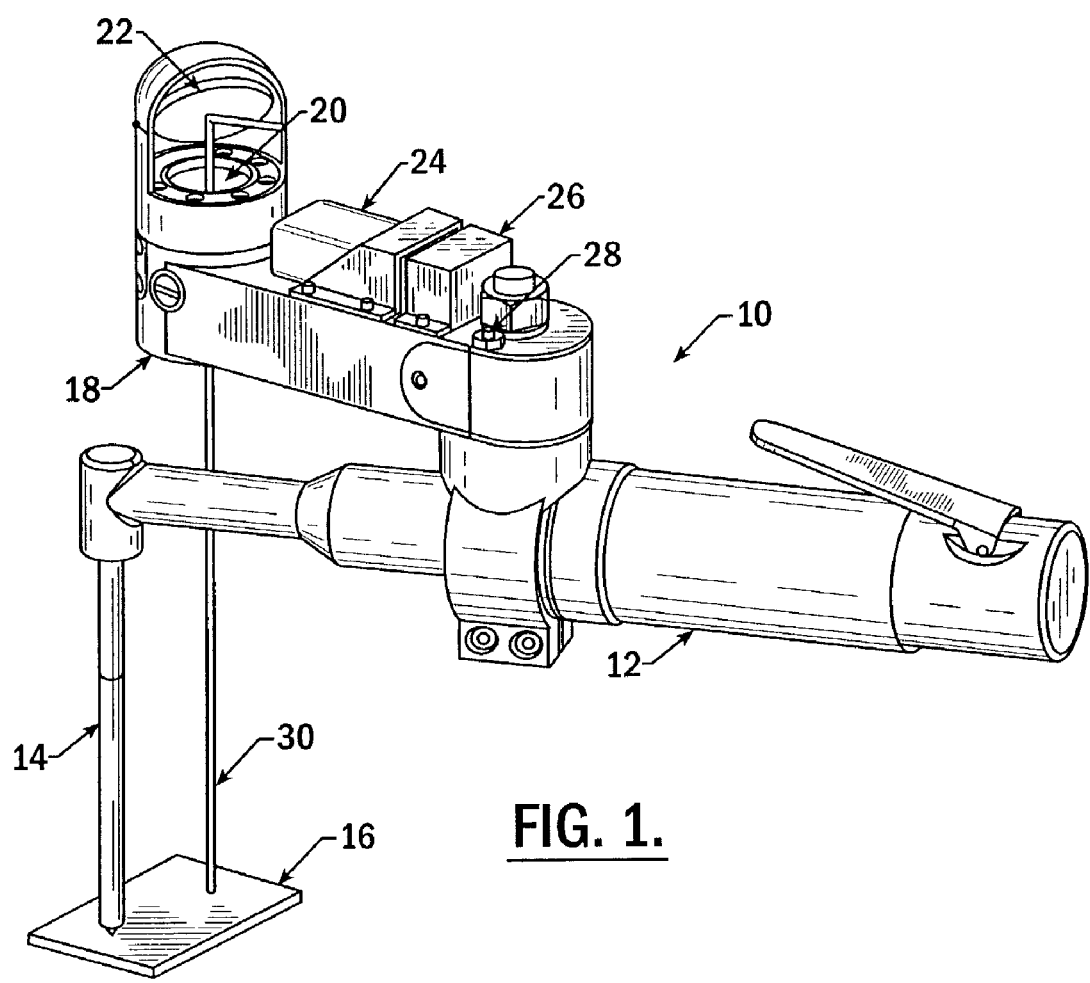
FIG. 1 is a perspective view of an apparatus for normalization of a drilling tool to a work surface mounted upon a 90 degree drill motor according to one embodiment of the present invention.

FIG. 1 depicts one embodiment of the apparatus 10 of the present invention mounted upon a 90 degree drill motor 12. Alternatively, the apparatus 10 may be mounted upon any other type of drill, particularly a portable drill, such as a pistol-type hand drill. Regardless of the type of drill, a drilling tool 14 attaches to the drill 12 for penetrating a work surface 16 to create a hole in the work surface. The drilling tool 14 may be any type of drill bit or other instrument, such as a reamer or the like, that may penetrate the work surface 16. The apparatus 10 of this embodiment generally includes a housing 18, a screen 20, a reflective surface 22, a power supply 24, a timer 26, and a switch 28. The housing 18 may contain a light source and a beam splitter to generate and direct the light beam 30. The light beam 30 is generally directed toward a work surface 16, at a predetermined angle with respect to the drilling tool 14, such that a reflection of the light beam provides a measure of the alignment of the drilling tool 14 to the work surface 16. The angle of the light beam 30 with respect to the drilling tool 14 may be such that the light beam 30 is generally directed parallel to the drilling tool 14, which is the embodiment of the present invention described hereinbelow. As also described below, the work surface 16 need not even be reflective, but may be any type of structure or object into which perpendicular holes are to be drilled, such as the components that comprise a building, aircraft, watercraft, bridge, and the like.

Figure 2:
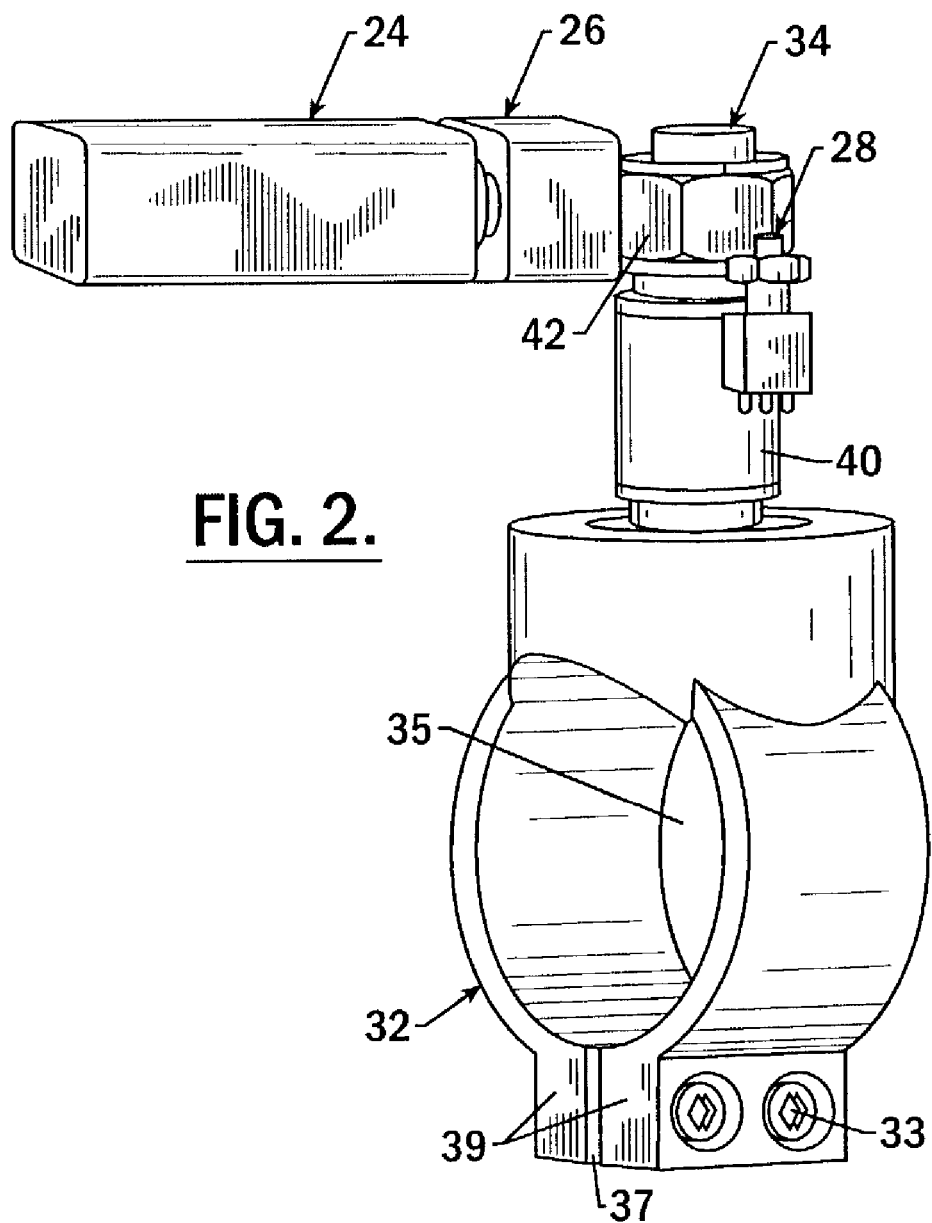
FIG. 2 is a perspective view of the mounting assembly and some of the components according to the embodiment of the apparatus of FIG. 1.

FIG. 2 illustrates an embodiment of the manner in which the apparatus 10 may be swivelably attached to the drill 12 to permit some movement with respect to the drill, such as during calibration as described below. Although the apparatus may be swivelably mounted in various manners, the apparatus 10 of the illustrated embodiment include a collar 32 with an opening 35 that fits around the body of the drill 12. In one embodiment, the collar 32 may be divided by an opening 37 with flanges 39 extending from each side of the opening 37. Each flange 39 may have at least one hole 33 through which a fastener may extend. Thus, the collar 32 may be tightened onto the drill 12 by tightening the fastener, which brings the flanges 39 closer together. Alternatively, the apparatus 10 may be attached to the drill 12 by a two-part clamp that tightens about the drill 12 by tightening fasteners that extend through opposite sides of the clamp parts, or in any other manner known to those skilled in the art.

Figure 5:
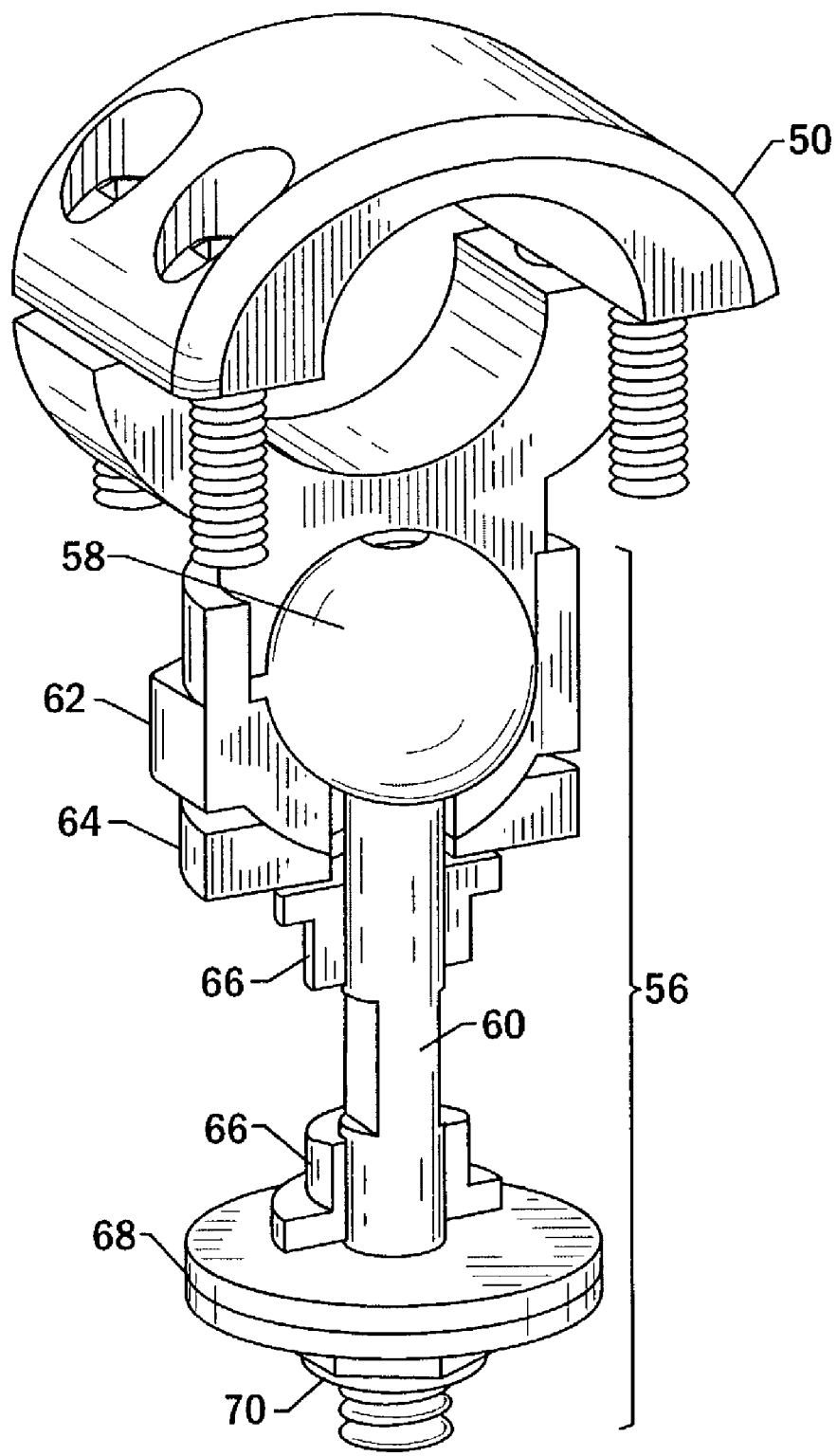
FIG. 5 is a cross-sectional view of an adjustable mounting assembly according to the embodiment of the apparatus of FIG. 4.

The housing 18 may be attached to the drill 12 and move relative to the drill 12, via a gimbal assembly, as shown in FIG. 5 and as described hereinbelow with respect to another embodiment. The ability to adjust the housing 18 relative to the drill 12 is advantageous in calibrating the apparatus 10, as is also described in detail hereinbelow.

FIG. 3 illustrates an embodiment of the optical components and the light path of one embodiment of the apparatus 10 of the present invention. The optical components may include a specular reflector 17, a light source 36, a beam splitter 38, a screen 20, and a reflective surface 22. The specular reflector 17 may be either the work surface 16, if the work surface is made of a reflective material, or a reflective surface that is positioned on the work surface in the area on which a light beam 30 directed from the light source 36 is incident. If the work surface 16 is not the specular reflector 17, the specular reflector 17 that is positioned on the work surface 16 may be a mirror, cellophane tape, adhesive-backed plexiglass, or any other flat and smooth material suitable for reflecting the light beam 30a.

The specular reflector 17 may be attached to the work surface 16 in any manner known to those skilled in the art, such as with an adhesive that does not harm the work surface 16 or leave a residue when removed, or with a clamp onto the work surface 16 or another structure that may be positioned parallel to the work surface 16. It should be kept in mind, however, that the portion of the specular reflector 17, whether part of or separate from the work surface 16, from which the light beam reflects should be parallel to the portion of the work surface 16 to be drilled so that the reflections of the light are also representative of the work surface 16 to be drilled.

The light source 36, such as a diode laser, may generate any type of light, preferably in the form of a visible light beam 30. A diode laser module that contains a diode laser, a power supply chip to regulate the power to the diode laser, and various optical elements, if desired, such as collimating, alignment and focusing elements may be used or the module may be built by combining the separate components. One example of a commercially available diode laser module is stock number 52-263 from Edmund Industrial Optics of Barrington, N.J.

When the light source is activated, it generates a light beam 30 that may be directed toward the specular reflector 17. A beam splitter 38 may facilitate directing the light beam 30. The beam splitter 38 may be a reflector or, more commonly, a splitter that allows some portion of the light beam 30 to pass through the splitter, designated as 30d, and directs the other portion of the light beam 30, designated as 30a, toward the specular reflector 17. Any type of splitter appropriate to direct the light beam 30 from the light source 36 may be used, such as a cube or mirror-type beam splitter, commercially available from Melles Griot, Inc. of Irvine, Calif. or Edmund Industrial Optics of Barrington, N.J. In order to prevent the light beam 30d from transmitting outside of the apparatus 10, an absorptive element 21 such as absorptive glass and, more particularly, UG-1 absorptive glass, may be located downstream of the splitter to receive and absorb unused portions of the light beam 30.

If the drilling tool 14 is perpendicular to the work surface 16, the light beam 30b returning from the specular reflector 17 after reflection will follow the same path as the transmitted light beam 30a such that the returning light beam 30b will also intersect the beam splitter 38. Again, some portion of the light beam 30b may pass through the splitter toward the screen 20, designated as 30c, while the other portion is directed toward the light source 36.

A window 23 also may be located on the underside of the housing 18 to protect the optical components contained in the housing from environmental or other degradation that could negatively affect the performance of the components. The window 23 may be made of any material, such as glass or plastic or the like that permits the light beams 30a and 30b to pass through the window without significant attenuation or refraction, while preventing contaminants, such as dust or particles created during drilling, from entering the housing. The window 23 may be positioned flush with the underside of the housing 18 or it may be canted, as shown in FIG. 3. A canted window 23 may be advantageous, for example, if the window is made of a material that causes a portion of the light beam 30a to be reflected toward the screen 20. Canting the window 23 directs the reflected light 30d toward the absorptive element 21 without affecting the operation of the apparatus 10.

Once the light beam 30b is reflected off of the specular reflector 17, the portion of the light beam 30b that passes through the beam splitter 38, designated as 30c, is received by the screen 20. The screen 20 may be made of any type of translucent material, such as ground glass. One example of the screen 20 is a screen of the type commercially available from Edmund Industrial Optics. The screen 20 also may contain an indicator marking 54 that signifies a predetermined portion of the screen 20 where the light reflected off of the specular reflector 17 should be received by the screen 20 if the drilling tool 14 is normal to the work surface 16, as explained in further detail hereinbelow in conjunction with FIGS. 4 and 6.

The light source is driven by the power supply 24, one illustration of which is shown in FIG. 2. The power supply 24 is therefore sized appropriately to power the light source that generates the light beam 30. For example, if the light source is a diode laser, the power supply 24 may be a 9-volt transistor battery. A timer 26 may be connected to the power supply 24 to control the length of time power is supplied to the light source and, in turn, the length of time the light source generates a light beam 30. For example, when the switch 28 is set in the "on" position by the operator, power may be supplied to the light source for the length of time determined by the timer 26. Alternatively or additionally, activating the drill 12 may also activate the power supply 24 and, thus, the light source, while the drill 12 is activated or for the duration of the timer 26. For example, if the drill is briefly activated, the light source may be powered for the duration of the timer 26 even if the drill 12 is deactivated prior to the end of the timer period. If the drill 12 is continuously activated, however, the light source may be powered for the duration of the drill activation period plus the duration of the timer 26. The timer 26 may be of any conventional design, as known to those skilled in the art.

FIGS. 1 and 3 also illustrate an adjustable reflective surface 22 that may be located near the screen 20 to receive an image of the screen 20. Thus, a drill operator drilling in an area where a view of the screen 20 is obstructed, such as drilling a surface located above the head, can view the image of the screen 20 on the adjustable reflective surface 22 for feedback regarding the normality of the drilling tool 14 to the work surface 16. In embodiments in which the screen 20 can be directly viewed, however, the apparatus need not include an adjustable reflective surface 22.

Figure 4:
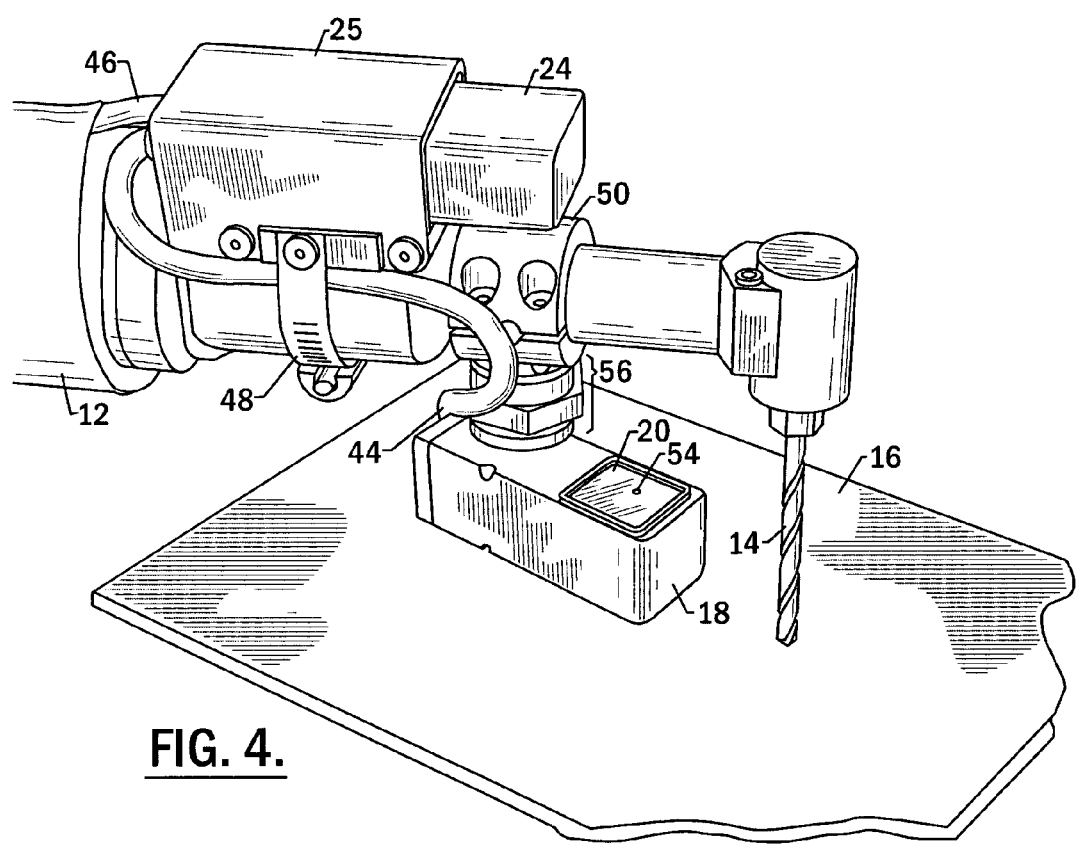
FIG. 4 is a perspective view of an apparatus for normalization of a drilling tool to a work surface mounted upon a 90 degree drill motor according to another embodiment of the present invention.

FIG. 4 depicts another embodiment of the apparatus 10 for normalization of a drilling tool 14 to a work surface 16 upon a 90 degree drill motor 12. In this embodiment, the work surface 16 is a specular reflector, such that it is not necessary to place a separate specular reflector 17 on the area of the work surface 16 on which the light beam is incident, as described above. The apparatus 10 of this embodiment also includes a housing 18, a screen 20, a power supply 24, and a timer, wherein the power supply 24 and the timer are at least partially mounted within the cover 25. The housing 18, again, may contain a light source and a beam splitter to generate and direct a light beam toward the work surface 16, similar to the configuration shown in FIG. 3. A reflective surface also may be located near the screen 20, if desired, in order to view the screen 20 when a direct view of the screen 20 is obstructed.

In this embodiment of the apparatus 10 of the present invention, the timer and power supply 24 are connected and are at least partially protected within the cover 25, such that the timer may control the length of time the power supply activates the light source, as described hereinabove. The timer and power supply 24 may be connected to the light source via the cable 44 or any other means known to those skilled in the art. In addition, the timer and power supply 24 may receive a signal that the drill 12 is activated via the cable 46 or any other means known to those skilled in the art. The cover 25 that holds the timer and at least a portion of the power supply 24, may be attached to the drill 12 using any appropriate means. One example is shown in FIG. 4 as a tie 48, made of a resilient material, such as plastic, metal or the like, that attaches to the cover 25 and tightens about the drill body. Alternatively, the timer and power supply may be uncovered and individually attached to the drill 12 in any appropriate manner known to those skilled in the art. Still further, the timer and/or the power supply 24 may be disposed within the housing 18 in some embodiments.

As FIG. 4 also shows, the housing 18 may be attached to the drill 12 by a clamp 50 and components designated as item 56. FIG. 5 is a detailed view of the clamp 50 and components 56. The clamp 50, as shown in FIG. 5, may be a two-part clamp that extends about the body of the drill 12 and tightens about the drill 12 via at least one fastener attaching the two clamp parts. In the illustrated embodiment, for example, fasteners connect the opposite sides of the two parts of the clamp 50, such that the clamp is securely fixed to the drill 12. To remove the clamp 50, at least one of the fasteners must be loosened or removed. Any other type of attachment known to those skilled in the art also may be used to mount the apparatus 10 to the drill 12.

The housing 18 may attach to the clamp 50 in various manners including via a gimbal assembly connected to a shaft 60 that extends through the housing 18. In the illustrated embodiment, the shaft 60 not only extends upwardly from the housing 18 to the gimbal assembly, but also extends completely through the housing 18. As such, bearings 66 may surround the portions of the shaft 60 within the housing 18 proximate the openings through which the shaft 60 enters the housing 18 to stabilize the shaft 60 within the housing 18 and to further isolate the components within the housing 18 from the environment. The bearings 66 may be made of any appropriate material, such as oil impregnated bronze, any other metallic material, or injection 10 molded plastic. One example of this type of bearing 66 is commercially available under the name Delron™. The bearings 66 and the housing 18 may be slid onto the shaft 60, such that the housing 18 is captured between bearings 66. The shaft 60 then may be secured to the housing 18 in any appropriate manner known to those skilled in the art. For example, the portion of the shaft 60 that extends beyond the housing 18 and extends toward the work surface 16 may be at least partially threaded, and at least one washer 68 may be placed about this portion of the shaft 60. A self-locking nut 70 may threadably engage the shaft 60 in order to retain the housing 18 upon the shaft 60. The self-locking nut 70 may engage the shaft 60 tight enough that the housing 18 does not move during drilling, but may be rotatable about the shaft 60 when pressure is applied to the housing 18 in order to orient the housing 18 with respect to the shaft 60 as desired.

On the opposite side of the housing 18, the portion of the shaft 60 that extends beyond the housing 18 may attach to the gimbal assembly and, in particular to a spherical member 58. The shaft 60 may be attached to the spherical member 58 in any appropriate manner, one example of which is to screw a threaded portion of the shaft 60 into a threaded aperture in the spherical member 58. The gimbal assembly may also include a retaining nut 62 fixedly attached to the clamp 50. The retaining nut 62 defines a semi-spherical seat to receive the spherical member 58. In addition, the retaining nut 62 defines an aperture through which the shaft 60 may extend. This aperture is somewhat larger than the shaft 60 to permit pivoting of the shaft 60 and, in turn, the housing 18 carried by the shaft 60 relative to the clamp 50. In the embodiment shown in FIG. 5, the part of the clamp 50 that attaches to the retaining nut 62 is also shaped to receive the spherical member 58. The retaining nut 62 may be attached to the clamp 50 in any manner that permits the spherical member 58 to be alternately fixed in position and permitted to rotate somewhat within the spherical recess collectively defined by the retaining nut 62 and the clamp. For instance, the retaining nut 62 and the part of the clamp 50 that attaches to the retaining nut 62 may be correspondingly threaded, such that the retaining nut 62 may be alternately advanced toward and backed off from the clamp 50 to tighten and loosen the grip on the spherical member 58. A washer 64 may be placed under the retaining nut 62 and above the housing 18. The washer 64 may be shaped to receive the curved portion of the retaining nut 62 to provide a secure fit between the retaining nut 62 and the washer 64. Thus, the configuration described above permits the retaining nut 62 to be loosened and the housing 18 repositioned somewhat relative to the drill 12 as a result of the limited motion permitted by the gimbal assembly. The retaining nut 62 may then be retightened to lock the housing 18 in position.

Part or all of the adjustment features of the embodiments described above may be utilized when calibrating the apparatus 10 of the present invention. The initial calibration may occur prior to mounting the apparatus 10 on the drill 12. First, the housing 18 is positioned in a calibration mounting fixture that holds the housing 18 a distance from a reflective surface. The distance is generally the average length of the all of the drilling tools 14 that may be attached to the drill 12. In addition, the housing 18 may be positioned on the calibration mouting fixture such that the axis of the shaft 60 is perpendicular to the reflective surface. The light source 36 is activated, and the beam splitter 38 directs the light beam toward the surface where the light beam is reflected, then received by the screen 20. The light source 36 and/or the beam splitter 38 then may be adjusted using adjustment screws 41 or the like. For example, as shown in FIG. 3, adjustment screws 41 may contact the beam splitter 38 and/or the light source 36. By accessing the adjustment screws 41 via openings 57 in the housing 18 and advancing or retracting the adjustment screws, the beam splitter 38 and/or the light source 36 may be repositioned in order to direct the light beam 30 appropriately. More specifically, the light source 36 and/or the beam splitter 38 are advantageously adjusted until the light is perpendicular to the reflective surface as indicated by an image received in a predetermined portion of the screen 20. Thus, this ensures that, in operation, when an image is created in the predetermined portion of the screen 20, the light creating the image has been reflected from a surface that is perpendicular to the light.

Figure 6:
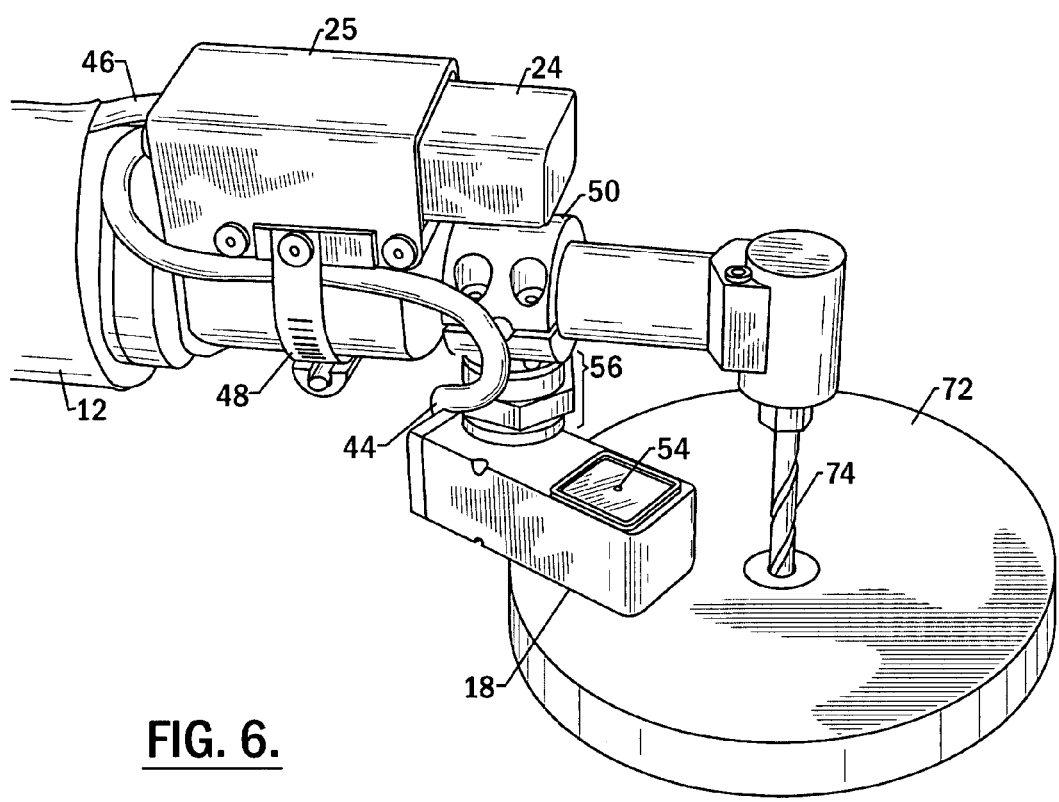
FIG. 6 is a perspective view of the embodiment of the apparatus of FIG. 3 during calibration of the apparatus.

The housing 18 then may be mounted to the drill 12 as described hereinabove. In order to calibrate the position of the housing 18 relative to the drilling tool 14, a surface that is perpendicular to the drilling tool 14 is obtained. FIG. 6 illustrates one way to ensure that the surface is perpendicular to the drilling tool 14. In this example, a reflective surface 72 is fixed perpendicular to a member 74. The member 74 may be attached to the drill 12 in the same way that the drilling tool 14 is attached to the drill 12, such as via the chuck. Therefore, when the member 74 is attached to the drill 12, the light source 36 and beam splitter 38 may direct the light onto the perpendicular surface 72. If the light received by the screen 20 is not within the predetermined portion of the screen 20, then the retaining nut 62 may be loosened from the clamp 50 in order to allow the spherical member 58 and the shaft 60 and, in turn, the housing 18 to move slightly. The housing 18 then may be adjusted to the position where the light received by the screen 20 is within the predetermined portion of the screen 20, and the retaining nut 62 may be tightened on the clamp 50 to secure the spherical member 58 in the desired position. As such, the apparatus is calibrated such that an image produced at the predetermined portion of the screen 20 is indicative of the drilling tool 14 being perpendicular to an underlying work surface 16. The adjustment mechanism described above also permits the housing 18 to be moved from one side of the drill 12 to the other as the housing 18 may be turned about the shaft 60 prior to being locked in position such that the housing 18 extends rearward of the drill motor instead of forward of the drill motor as shown in FIG. 4, if so desired.

Once the apparatus 10 is calibrated, as discussed above, then the drill operator may rely upon the apparatus to provide feedback regarding the normalization of the drilling tool 14 to the work surface 16. The drill operator first positions the specular reflector 17 on the area of the work surface 16 on which the light beam is incident, if the work surface 16 is not itself a specular reflector. The drill operator then positions the drilling tool 14 on the area of the work surface 16 to be drilled. The drill operator either activates the power source 24 and, thus, the light source 36 with the switch 28 or activates the drill 12 momentarily to trigger the timer 26 and the power source 24, and, thus, the light source 36. The drill operator then views the screen 20 to determine where the light is received. If the drill operator cannot directly view the screen 20, a reflective surface 22 may be attached near the screen 20 to reflect an image of the screen 20 toward the drill operator.

If the light is not received in the predetermined portion of the screen 20, then the drill operator reorients the drill 12 until the light is received in the predetermined portion of the screen 20. For example, when the predetermined portion of the screen 20 is the center of the screen 20, FIG. 7 illustrates a representation of a screen 20 when the drilling tool 14 is not normal to the work surface 16. In this example, the light received by the screen 20 is shown as the dot 76, which is not located in the center of the screen 20. Thus, when the drilling operator views the screen 20 of FIG. 7, the drilling operator is immediately informed that the drill position must be oriented in relation to the work surface 16 until the dot 76 is at or near the center of the screen 20. FIG. 8 is an example of the view of the screen 20 when the drill 12 has been oriented such that the light received by the screen 20 is at or near the center of the screen 20. Therefore, in this example, the drilling tool 14 would be normal to the work surface 16, and the drill operator may begin drilling.

Throughout the drilling process, the drill operator may continue to view the screen 20 to maintain the light received by screen in the predetermined portion of the screen 20. If, during the drilling process, the light received by the screen 20 is no longer in the predetermined area of the screen 20, then the drill operator may immediately correct the orientation of the drill 12. Because the drill operator can ensure that the drilling tool 14 is normal to the work surface both before and during the drilling of a hole, fewer non-perpendicular holes will be drilled and, thus, fewer costly repairs must be made.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for normalization of a drilling tool to a work surface, comprising:
 a light source;
 a beam splitter to direct at least a portion of the light generated by said light source toward the work surface at a predetermined angle with respect to the drilling tool;
 a screen to receive at least a portion of the light reflected off of the work surface;
 a housing containing said light source, said beam splitter and said screen;
 a gimbal assembly connecting said housing to a drill such that said housing is adjustably positionable relative to the drill so as to alter an angle defined by the light with respect to the work surface without similarly altering the drilling tool; and
 a clamp connecting said gimbal assembly to the drill.

2. The apparatus of claim 1, wherein the predetermined angle is such that the light is directed along a path parallel to the drilling tool.

3. The apparatus of claim 1, wherein said housing is swivably attached to the drilling tool.

4. The apparatus of claim 1, further comprising a timer controlling length of operation of said light source.

5. The apparatus of claim 1, wherein said light source is a diode laser.

6. The apparatus of claim 1, wherein said screen has an indicator to indicate a point of illumination indicative of the drilling tool being normal to the work surface.

7. The apparatus of claim 1, wherein said screen is a ground glass screen.

8. The apparatus of claim 1, further comprising a reflective surface proximate said screen to view an image of said screen when a direct view of said screen is obstructed.

9. The apparatus of claim 8, wherein said reflective surface is a mirror.

10. The apparatus of claim 1, further comprising a specular reflector positioned on the work surface to reflect the light toward said screen.

11. The apparatus of claim 10, wherein said specular reflector is a mirror.

12. The apparatus of claim 10, wherein said specular reflector is optically smooth reflective tape.

13. A method for calibrating an apparatus for normalization of a drilling tool to a work surface, comprising:
 positioning the apparatus on a mounting fixture to hold the apparatus a distance from a reflective surface;
 adjusting at least one of a light source and a beam splitter relative to a housing containing the light source and the beam splitter until light generated by the light source is perpendicular to the reflective surface as indicated by an image of the light that has reflected off of the surface is located in a predetermined portion of a screen;
 thereafter adjusting a relative position of the housing containing the light source, the beam splitter, and the screen with respect to the drilling tool until an image of the light that has reflected off of a surface perpendicular to the drilling tool is located in the predetermined portion of the screen; and
 maintaining the light proximate the predetermined portion of the screen during operation of the drilling tool.

14. The method of claim 13, wherein the apparatus comprises a shaft to connect the apparatus to a drill, and wherein positioning the apparatus on a mounting fixture comprises positioning the apparatus such that the axis of the shaft is perpendicular to the reflective surface.

15. The method of claim 13, wherein adjusting the housing occurs subsequent to mounting the apparatus on a drill.

16. The method of claim 13, wherein adjusting at least one of the light source and the beam splitter comprises adjusting at least one of the light source and the beam splitter relative to the drilling tool so as to alter an angle defined by the light with respect to the reflective surface without similarly altering the drilling tool.

17. A method for calibrating an apparatus for normalization of a drilling tool to a work surface, comprising:
 positioning the apparatus on a mounting fixture to hold the apparatus a distance from a reflective surface;
 adjusting at least one of a light source and a beam splitter until light generated by the light source is perpendicular to the reflective surface as indicated by an image of the light that has reflected off of the surface is located in a predetermined portion of a screen, wherein adjusting at least one of the light source and the beam splitter occurs prior to mounting the apparatus on a drill;
 adjusting a relative position of a housing containing the light source, the beam splitter, and the screen with respect to the drilling tool until an image of the light that has reflected off of a surface perpendicular to the drilling tool is located in the predetermined portion of the screen; and
 maintaining the light proximate the predetermined portion of the screen during operation of the drilling tool.

* * * * *